United States Patent Office 3,650,928
Patented Mar. 21, 1972

3,650,928
PROCESS FOR PREPARING FLUORINATED OXYGEN-CONTAINING COPOLYMERS
Dario Sianesi, Adolfo Pasetti, and Costante Corti, Milan, Italy, assignors to Montecatini Edison S.p.A., Milan, Italy
No Drawing. Continuation-in-part of applications Ser. No. 446,292, Apr. 7, 1965, and Ser. No. 650,257, June 30, 1967. This application Apr. 2, 1969, Ser. No. 812,844
Claims priority, application Italy, Apr. 9, 1964, 7,678/64
Int. Cl. C07c 51/58; B01j 1/00; C08d 1/00
U.S. Cl. 204—159.22
5 Claims

ABSTRACT OF THE DISCLOSURE

Perfluorinated linear polyethers are prepared by liquid phase photochemical reaction of a mixture of perfluoropropylene and tetrafluoroethylene with oxygen in the presence of ultraviolet radiation.

CROSS REFERENCE TO RELATED APPLICATION

This application is a continuation-in-part of our copending patent applications Ser. No. 446,292, filed Apr. 7, 1965, now U.S. Pat. 3,442,942, issued May 6, 1969; and Ser. No. 650,257, filed June 30, 1967, now abandoned.

BACKGROUND OF THE INVENTION

(1) Field of the invention

This invention relates to new products consisting essentially of carbon, fluorine and oxygen atoms having the structure of linear copolyethers and to a process for preparation thereof.

Chemical resistance and thermal resistance are two of the most attractive and appreciated characteristics of fluoro-organic compounds which contain a high percentage of combined fluorine in their molecules. Because of these and other favorable physico-chemical properties, the fluorinated compounds are of great interest and have found numerous useful applications.

For many of these applications, fluorinated substances containing chemically reactive functions, e.g., double bonds, oxygen to oxygen bonds, carboxyl groups and their derivatives, carbonyl groups etc., in their molecules, are highly desired. These reactive groups permit various subsequent transformations of these molecules, which determine their particular physicochemical characteristics and make possible their chemical interaction with other molecules.

For other applications, e.g., for use as fluids for heat transfer, for lubrication under particular conditions, or for electric insulation, there are required high molecular weight fluorinated compounds which (1) are liquid over a wide range of temperatures, (2) have a relatively low vapor pressure and (3) exhibit a high degree of chemical and thermal stability. For these and other applications, perfluorinated products are highly suitable, i.e., products which do not contain appreciable amounts of elements other than carbon, oxygen, and fluorine and, in particular, do not contain hydrogen in their molecule. Such perfluorinated products, in fact, generally possess the highest characteristics of chemical inertia and often of thermal stability.

(2) Description of the prior art

It is known that fluorinated and perfluorinated products having a rather high molecular weight can be readily obtained by polymerization and copolymerization of fluoro- and perfluoro-olefins. Usually, however, the products thus obtained are high molecular weight polymers having the appearance and characteristics of solid substances, both at room temperature and at somewhat higher temperatures. Accordingly, they are unsuitable for most of the applications referred to above wherein it is necessary to employ materials having a low volatility but which are liquid at room temperature and over a wide range of temperatures.

Attempts have been made to obtain high molecular weight fluorine-containing products possessing these characteristics by telomerization reactions of fluoro-olefins. By this type of reaction, for which considerable descriptive literature exists, various products were obtained. The chemical structure of these products can be represented by the general formula $X(A)_nY$, wherein X and Y are atoms or atom groups derived from the telogenic agent, XY, employed, A is a combined unit of the fluoro-olefin, and $n$ is an integer between about 1 and 100.

However, the telomers that can be obtained from the fluoroolefins, and in particular from fluoroethylene, which as a practical matter are the only telomers that can easily be obtained, exhibit a significant drawback which hinders their use for many of the desired applications. Thus, the molecules of the telomers consist essentially of a regular sequence of equal (A) units bound one to another by carbon to carbon bonds. This imparts to the molecules a considerable rigidity and a high tendency to crystallize. (It is well known that the linearity and regularity of the structure of macromolecules appreciably promotes the crystallization process.) It is also known that rotation around the C—C bonds is hindered by a strong energy barrier, in contrast to the condition existing with the C—O bonds. Thus, C—O bonds have a considerable freedom of rotation. Consequently, when a telomer of, for example, a fluoroethylene has a value of $n$ sufficiently high to render its vapor pressure negligible or very low, it is normally a solid or a wax at room temperature. When the telomer is brought to the molten state by heating, it generally becomes a highly volatile liquid, having a low viscosity and a high variation of viscosity with temperature, so that it is, accordingly, unsuitable for most of the desired applications.

It is known, for example from Belgian Pat. 616,756, and French Pats. 1,359,426 and 1,362,548, to prepare perfluoroethers by polymerizing epoxides of perfluoroolefins in the presence of active carbon or alkaline catalysts. The products thus obtained are polyperfluoroalkylenethers having a thoroughly regular structure as regards both the units forming the chain and their distribution, and are characterized by the fact that each of their two terminal groups is the same in all chains. These products consist of chains wherein C—O and C—C bonds are regularly alternated (—C—C—O—C—C—O—). As stated above, C—C bonds have a marked energy barrier which tends to oppose their rotation whereas this is not the case for C—O bonds.

It is desirable, however, to have available products having a higher incidence in the polymeric chains of C—O bonds with respect to C—C bonds than is the case in the products of the foregoing processes. Furthermore, it is desirable to have available products containing peroxidic groups, since they can be processed further due to the reactivity of the oxygen-to-oxygen bonds and furthermore can be used as curing agents of elastomeric materials, more specifically fluorinated elastomers.

SUMMARY OF THE INVENTION

We have found that it is possible to obtain products having good dielectric, viscosity and lubricating characteristics, and which, because of the possibility of a higher incidence of C—O bonds with respect to C—C bonds, may have improved properties as regards variations of viscosity with temperature, these products being obtained by means of direct reaction of a mixture of perfluoropropylene and tetrafluoroethylene with molecular oxygen under ultraviolet radiations. Stable products having a very high molecular weight and containing only carbon, fluorine and oxyen atoms in their molecules are obtained. These products have varying structures depending on the particular reaction conditions employed and consist of chains wherein there can be present sequences of C—O bonds and also —O—O— bonds, and different terminal groups. These products are obtained, in accordance with the present invention, by means of direct reaction of perfluoropropylene and tetrafluoroethylene with molecular oxygen or with a gas containing oxygen, by operating in a liquid phase comprising perfluoropropylene or an inert solvent containing at least 0.01 mol/liter of $C_3F_6$, said liquid phase containing from 0.01 to 1 mole of tetrafluoroethylene per liter of liquid phase, at temperatures between —100° and +25° C., preferably between —70° and +20° C., under about atmospheric pressure, in the presence of ultraviolet radiations at least 1% of which are of a wave length below 3300 A.

The new products of this invention are the linear perfluorinated copolyethers and mixtures thereof having the formula

II $$A-O-(C_3F_6-O)_P-(CF_2-O)_Q-(CF_2-CF_2-O)_R-\left(\begin{matrix}CF_3\\|\\CF-O-\end{matrix}\right)_T-(-O-)_S-B$$

wherein: $C_3F_6$ is a perfluoroalkylene unit derived from the opening of the double bond of a hexafluoropropylene molecule, the different oxyperfluoroalkylene units having a random distribution along the polyether chain; (—O—) is an atom of peroxidic oxygen; A and B are the same or different groups selected from the group consisting of

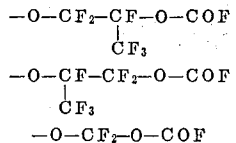

and —CF(CF$_3$)—COF; and P, Q, R, T and S may be the same or different numbers, Q, T and S may each or all be equal to zero, P and R are numbers between 1 and 100. Q is zero or a number between 1 and 80, T is zero or a number between 1 and 9, S is zero or a number between 1 and 50, the sum of $P+Q+R+T$ is a number between 2 and 100, the ratio $R/P$ is a number between 0.01 and 10, the ratio $Q/(P+R+T)$ is a number between 0 and 5, the ratio $S/(P+Q+R+T)$ is between 0 and 0.5 and the ratio $T/(P+Q+R)$ is between 0 and 0.1. When integer S is zero, the linear perfluorinated copolyethers of this invention, for sufficiently high values of P and R, are to be regarded as trus copolymeric polyethers.

It is to be noted that linear perfluorinated polyethers conforming to the foregoing formula may possibly contain therewithin units of $C_3F_6$ bonded directly to one another. Any such units are present in extremely minor amounts, i.e., less than about 2% by weight, and, if present, do not affect the properties of the polyethers. Similarly there also can be present in the chains perfluoroalkylene units having the structure —$(CF_2)_m$— with $m>2$ and $<5$. If present, these units do not amount to more than 3% weight of the copolyether.

The mixtures of copolyethers obtained by the process of the present invention are further characterized in that they contain, in general, equal numbers of perfluoroalkyl terminal groups and of terminal groups containing a COF function. Of the foregoing perfluoroalkyl terminal groups, the radical $CF_3$— is definitely prevailing, whereas among the different terminal groups containing the COF function, namely the —COF,

—$CF_2$—COF and —CF(CF$_3$)— —COF groups, the —COF group itself is distinctly prevailing. Therefore, since said —COF group is connected to the chain structure through an oxygen atom, it is really part of a fluoroformate group. These fluoroformate groups can exhibit the following three structures:

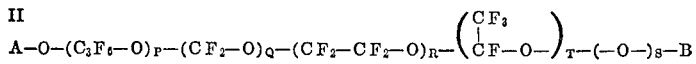

$$-O-CF-CF_2-O-COF$$
$$|$$
$$CF_3$$

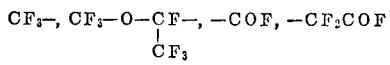

The distribution of these different fluoroformate groups is obviously directly related to the composition of the copolyether chains with respect to the average values of $P/(P+Q+R+T)$, and $Q/(P+Q+R+T)$.

DESCRIPTION OF THE PREFERRED EMBODIMENTS

The various perfluoroalkylene units forming the chains of the new polyether products are considered as being distributed in a random manner, since there are no particular criteria for imposing either successions of the same units or alternations of different units. On the other hand, the units indicated by the symbol (—O—) correspond to the presence of peroxidic bonds. That is, these units do not form sequences and must be understood as always being between two oxyfluoroalkylene units.

The polyethers of this invention are usually obtained in the form of a mixture of molecules having different molecular weights, different distributions of the various units, and presumably also different compositions. One can, of course, isolate from these mixtures pure chemical compounds, characterized by a particular structure of the terminal groups A and B, a particular distribution of the various units in the chains, and a precise value for the indices P, Q, R, S, T, the indices Q, T and S having effectively a value of zero or of a whole number.

It is however, frequently preferable, in order to characterize the structure of the whole polymer, to have recourse to concepts usually used in the field of macromolecular chemistry and, more particularly in the field of copolymers and terpolymers, such as the concepts of average molecular weight and of average composition. In this case, the formula reported above remains perfectly valid, but each of the indices P, Q, R, S and T represents an average value and can therefore have a value not necessarily corresponding to that of a whole number. Moreover, the structure of terminal groups A and B cannot in this case be indicated by a simple formula since it results from the contribution of the aforementioned possible different structures.

The present invention also provides a process for the preparation of the copolyethers, which process comprises subjecting a mixture of perfluoropropylene and tetrafluoroethylene in the liquid phase to a photochemical reaction with molecular oxygen, at a partial pressure between about 0.1 and 1 atmosphere, at a temperature between about —100° C. and +25° C., preferably between —70° and +20° C. at a pressure from about atmospheric pressure to about 5 atmospheres, in the presence of ultraviolet radiation containing at least 1% of radiation having a wave length below 3300 A. the oxygen being fed to the liquid reaction phase in such amount as to maintain the liquid phase continuously saturated with oxygen, the tetrafluoroethylene being dissolved in the liquid phase in a concentration of from 0.01 to 1 mole per liter of liquid phase.

The process may be conveniently carried out by passing a stream of a gaseous mixture of tetrafluoroethylene and molecular oxygen or an oxygen-containing gas such as, e.g., air, through a liquid phase of hexafluoropropylene, in the presence of U.V. radiations as previously defined. Within the scope of the process, one can select operating conditions whereby there is obtained a high degree of specificity towards the formation of a copolyether having one particular composition rather than of another among the ones previously defined.

The structure of the linear polymeric products and mixtures thereof included in the general formula is highly influenced by three main reaction parameters: (1) the temperature, (2) the irradiation intensity applied to the liquid reaction phase, (3) the concentration of $C_3F_6$ and of $C_2F_4$ in the liquid phase. By appropriate selection of the operating conditions for these parameters it is therefore possible to direct the reaction toward the formation of one type of product rather than toward another.

It has been found that essentially copolymeric products are obtained of the formula

wherein P, R, S, A and B are as previously defined, by carrying out the reaction at temperatures lower than about −40° C.

If the reaction is carried out at a temperature between about −10° C. and about −40° C. there are present in the final mixture of copolyethers minor amounts (about 2–3% by mols) of —$CF_2O$— units besides from the principal units —$C_3F_6O$— and —$C_2F_4O$—. When operating at higher temperatures, and particularly at temperatures higher than 0° C. the percentage of —$CF_2$—O— units in the reaction product increases. Thus, the higher the temperature, the higher the percentage of oxyfluoromethylene unit, so that these oxyfluoromethylene units become a very important characterizing feature of the copolyether chain.

More particularly, when using a temperature above −10° C., the average molar ratio between the units —$CF_2$—O— and the other two types of units

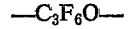

and —$C_2F_4O$— will have a value within the limits of 0.02 and 5. This ratio, as will also be seen from the following experimental examples, increases with increasing reaction temperature. The same trend is shown by the unit

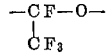

however, its frequency along the copolyether chain is generally very low and it increases with both temperature and the $C_3F_6/C_2F_4$ ratio in tht reaction zone.

In addition, the temperature very markedly influences the average molecular weight of the polymeric products, i.e., the value of the sum of $P+Q+R+T$. The highest average molecular weights will generally be obtained at the lower temperatures whereas lower average molecular weights are obtained by operating at higher temperatures.

Moreover, it is also possible to regulate the average molecular weight so as to obtain a desired value by varying the concentration of the two perfluoroolefins in the liquid phase. The higher molecular weights are obtainable by using a high concentration of $C_3F_6$, e.g., by using undiluted $C_3F_6$, whereas lower molecular weights are obtained by using an inert solvent in the process so that the $C_3F_6$ concentration is reduced.

As previously pointed out, the crude copolymeric product obtained by the process of this invention is generally characterized by a rather wide distribution of molecular weights, as usually occurs in all telomerization, oligomerization and polymerization reactions. It is therefore necessary to have recourse to average values of molecular weight in order to characterize the entire crude copolymeric product.

As regards the ratio $R/P$ in the obtained copolyether chain, this can be varied by varying the ratio of the concentration of $C_2F_4$ to that of $C_3F_6$ in the liquid phase. Thus, when the ratio of the molar concentrations of $C_2F_4$ to $C_3F_6$ is of the order of 0.01, the ratio $R/P$ in the copolyether is itself of the order of 0.01. Upon increasing the concentration in the liquid phase of $C_2F_4$ with respect to $C_3F_6$, the ratio $R/P$ is likewise increased accordingly up to a value of about 10. As a consequence, the increase in the molar concentration of $C_2F_4$ to $C_3F_6$ at the same temperature, causes an increase of the $Q/(P+R+T)$ ratio. The concentration of $C_2F_4$ must be maintained, however below the value of 1 mole per liter of liquid phase in order to prevent its homopolymerization to a significant extent.

Another important characterizing feature of our copolymeric products is the content of peroxidic oxygen, which is represented by one of the ratios $$S/(P+Q+R+T)$$

or $S/(P+Q+R+T+1)$. The latter ratio is the more meaningful inasmuch as it represents the ratio between the number of peroxidic bridges and the sum of all the —C—O—C— and —C—O—O—C— bridges present throughout the chain.

As previously noted, the content of peroxidic bridges in the crude polymeric product is such that the ratio $S/(P+Q+R+T)$ varies from zero to 0.5.

The concentration of peroxidic groups depends on the intensity of irradiation and can be varied within the desired limits by utilizing suitable average irradiation conditions in the reaction zone. The concentration of the peroxidic groups depends also on the degree of conversion actually obtained during the reaction.

The average intensity of irradiation of a reaction system is in general a quantity that is difficult to define by numbers, since it depends on several parameters and is highly influenced by the particular geometry of the reaction system. A meaningful indication of the average value of the irradiation intensity in a sufficiently symmetrical reaction system can, however, be inferred from a consideration of three fundamental elements:

(1) The amount of useful U.V. radiations having a wave length lower than 3300 A. penetrating in the time unit the reacting phase, E (watt);

(2) The surface through which the radiations penetrate the reaction system, S (cm.$^2$); and (3) The volume of the reaction system, V (cm.$^3$).

If one considers, e.g. the particular instance in which the U.V. radiation source is placed completely inside the reaction system and the surface S consists of a material that is completely transparent to the useful U.V. radiations, the value of E can be considered as equal to the amount of radiations, having useful wave length, emitted by the source. If on the contrary, either because the U.V. source is placed outside the reaction system or because between the U.V. source and the reacting system there is placed a medium having a certain absorption power for the radiations, so that only a portion of the useful radiations emitted by the source reach surface S or in any event penetrate the reaction system, the value of E can then be calculated, either through a simple consideration of geometric factors or by a real measurement of the quantity of useful radiations as can be obtained by having recourse to actinometric methods, well known to those skilled in the art.

The value of surface S must be considered in an appropriate manner, namely, by referring to an ideal geometric surface which most nearly could be compared with the actual surface. In other words, the value of S must be calculated without taking into account surface irregularities or slight differences with respect to a perfect geometrical form. The reaction volume must be considered as equal to that which can be actually reached by the U.V. radiations, without taking into account the possible phenomena of absorption of the radiations by the liquid medium.

We have observed that, in order to represent in a meaningful way, the situation of average irradiation which characterizes a particular reaction system and which would directly influence the formation of relatively more or less peroxidized reaction products, one may have reference to an "average irradiation index" I, which is defined by the equation $$I = \frac{100 \times E}{S^{1/2} V^{1/3}} \text{ (watt/cm.}^2\text{)}$$

wherein E, S and V are as defined above.

We have ascertained that it is possible to obtain, from liquid-perfluoropropylene, tetrafluoroethylene and oxygen, reaction products having a desired content of peroxidic groups, by using an average irradiation index of from 0.1 to 50 watts/cm.$^2$. A low content of peroxidic oxygen, i.e., $S/(P+Q+R+T+1)$ less than 0.2, is obtained by adapting reaction conditions whereby index I is greater than 2 and preferably greater than 3. On the contrary, with values of I less than 2, or preferably less than 1, copolyethers containing substantial peroxidic oxygen content, i.e., $S/(P+Q+R+T+1)$ greater than 0.2, can be obtained.

It should be noted, however, that not only will the irradiation conditions influence the extent of the peroxidic nature of the reaction products. Thus, other reaction conditions, such as, e.g., the degree of conversion, will also affect this characteristic of the products. More particularly, it has been ascertained that even in the presence of a sufficiently high average-irradiation intensity (I greater than 2), the copolyether products formed in the initial step of the photochemical reaction between liquid perfluoropropylene, tetrafluoroethylene and oxygen, may contain a considerable quantity of peroxidic groups. The average content of peroxidic oxygen of the products decreases rapidly, however, as the reaction progresses, so that, when e.g., a conversion higher than 5–10% of the perfluoroolefins initially present in the reaction zone is reached, provided that the concentration of the copolyether formed in the liquid irradiated phase is at least 5–10% by weight, the peroxidic content reaches a practically constant value that can be either zero or very slight, depending upon the particular value of I. Conversely, even by using a rather low intensity of irradiation, for example, I lower than 1, it is possible to obtain copolyethers having a reduced content of peroxidic oxygen, such as $S/(P+Q+R+T+1)$ lower than 0.2, by carrying out the reaction to a high final degree of conversion, for example, of the order of 60–70% of the fluoroolefins initially present in the reaction system, or in any case by carrying out the reaction until a concentration of copolyether in the liquid irradiated phase of at least 60–70% by weight is reached.

The statements previously made relating to the effect of the average-irradiation intensity on the peroxidic character of the reaction products, should in a strict sense, actually be understood to refer to the products obtained at concentrations not less than about 5% and not greater than about 70% by weight of the copolyether in the liquid irradiated phase.

Additionally, it has been ascertained that the reaction temperature exerts a certain influence on the characteristics of the products, in the sense that by lowering the reaction temperature below about −65° C., the irradiation conditions being the same, the reaction products tend to have a higher content of peroxidic oxygen.

As regards the amount of oxygen to be employed in order to maintain the liquid reaction phase saturated with oxygen, it has been ascertained that an excess of oxygen should be used with respect to the amount of oxygen consumed during the reaction. In other words, the rate of oxygen fed into the reaction zone should exceed the rate at which the oxygen is being consumed during the reaction.

For example, when operating at about atmospheric pressure, the excess of oxygen in the liquid reaction phase can be obtained by bubbling into the reaction mixture an amount of oxygen, either in pure state or diluted in an inert gas, that is at least twice that amount that is simultaneously being consumed. The excess of oxygen leaving the reaction carries along such volatile reaction side products as $COF_2$, $CF_3$—COF and the epoxides $C_3F_6O$ and $C_2F_4O$. It is also possible to operate without having an outflow of oxygen from the reactor. In such instance, in order to operate in the presence of an excess of oxygen, it is necessary to maintain a high oxygen partial pressure in the reactor while the reaction is carried out. This can be achieved, for example, by operating at low temperatures (of the order of −40 to −60° C.) and at a pressure higher than atmospheric, preferably 2 to 5 atmospheres or higher and by continuously maintaining such pressure so as to replenish the amount of oxygen consumed. In this instance, the higher pressure maintains the partial pressure of the volatile reaction products in the vapor phase at a low value, so as not to disturb the reaction that thus can continue so long as there is oxygen available in the liquid mixture, i.e., the oxygen concentration in the liquid mixture is maintained at saturation.

We have also found that it is particularly convenient to carry out the photochemical reaction between oxygen, perfluoropropylene and tetrafluoroethylene in the presence of a liquid phase by adding to the reaction system another compound which is liquid under the reaction conditions. The use of an inert solvent is of course necessary when the reaction is carried out at temperatures above the boiling point of the $C_3F_6+C_2F_4$ mixture at the selected pressure. This diluent may be any of various compounds which do not appreciably react with oxygen under the selected irradiation conditions. The diluent may act as a solvent for either the perfluoroolefin reactants or for some or all of the reaction products.

Compounds which are suitable for this purpose include halogenated solvents such as perfluorinated hydrocarbons, perfluorochlorinated hydrocarbons and chlorofluorinated hydrocarbons. More particularly, these may include, for example, perfluorodimethylcyclobutane, liquid perfluoroparaffins, perfluorocyclobutane, perfluorobenzene, carbon tetrachloride, chloroform, methylene chloride, methylchloroform, and chlorofluoro derivatives of methane, ethane or propane, such as $CF_3Cl$, $CF_2Cl_2$, $CFCl_3$, $CHF_2Cl$, $CHFCl_2$, $CF_2Cl$—$CF_2Cl$, $CFCl_2CF_2Cl$, $$CCl_3-CF_3$$

$CF_2Cl$—$CH_3$, $CF_3$—$CFCl$—$CF_2Cl$, etc.

The reaction may be carried out according to an essentially batchwise technique. In accordance with this technique, there is introduced into a reactor containing the initial charge of liquid perfluoropropylene and of tetrafluoroethylene, either in the pure state or in solution in preferably perhalogenated solvents, at the temperature condition selected for the reaction, with irradiation by means of an U.V. light from a suitable source such as a mercury vapor lamp, a stream of molecular oxygen or of a gas containing molecular oxygen such as air, such introduction preferably being across the entire liquid phase. It is also possible and as a matter of fact preferable, to feed gaseous tetrafluoroethylene continuously into the liquid phase, in order to keep the concentration of dissolved $C_2F_4$ at a constant and desired level. In this case it is not necessary that the liquid phase contains an initial charge of $C_2F_4$. (When the process is carried out at relatively high temperatures, for example, higher than 0° C., it is preferable to continuously feed a gaseous stream of $C_2F_4$, $C_3F_6$ and $O_2$, into a liquid irradiated phase that consists, at the beginning, of the solvent alone maintained at the desired temperature).

The excess oxygen leaving the liquid phase is saturated with tetrafluoroethylene and also contains most of the low molecular weight volatile reaction products such as, e.g., $COF_2$, $CF_3COF$ and the epoxides $C_2F_4O$ and $C_3F_6O$. By means of a suitable reflux condenser, most of the entrained perfluoropropylene and tetrafluoroethylene may be removed and recycled to the reaction zone, while the low molecular weight products having an acidic charactr are separated from the oxygen by washing with water or alkaline solutions.

The thus purified oxygen, after careful drying, may be recycled to the reaction zone as part of the oxygen feed. The reaction is carried out under selected conditions until the desired degree of conversion of the starting perfluoropropylene and of tetrafluoroethylene is reached. Thereafter the U.V. irradiation is stopped and, by distillation of residual perfluoropropylene, tetrafluoroethylene and solvent if present, there is obtained as a residue the higher molecular weight linear products in the form of a colorless viscous oil.

It is also possible and frequently preferable to carry out the reaction in a completely continuous manner. In such instance, a portion of the liquid phase present in the reaction zone is continuously removed from the system. By suitable means, e.g., by distillation, perfluoropropylene tetrafluoroethylene and solvent are separated from the reaction products in the removed portion and are continuously recycled to the reactor while the amount of perfluoroolefins consummed by the reaction is taken into account and added as make up.

The determination of the actual average structure of the linear copolyethers may be carried out by suitable chemical or spectroscopic analysis.

The empirical formula of the products can be obtained from the elemental analysis data and from a determination of the average molecular weight (e.g., by osmometric or vapor pressure measurements). The content of oxygen linked in the peroxidic form may be determined by iodometric analysis.

The linear copolyethers obtained by reaction of oxygen with hexafluoropropylene and tetrafluoroethylene under the described conditions have terminal chain groups generally consisting of $CF_3$— radicals linked to oxygen and of —COF groups, these last groups being bound either to an oxygen atom or to a carbon atom, such as, e.g., in —O—$CF_2$—COF, or

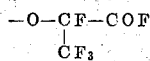

These —COF groups are revealed in the infrared absorption spectrum by a characteristic absorption in the $5.25\mu$ zone. The spectrum of nuclear magnetic resonance of F gives all the other desired data, both qualitative and quantitative, i.e., to determine the nature of the units in which fluorine appears and their respective amounts. The resonance bands (and number of fluorine atoms to which they are attributable) of various of the constituent (chain) groups and of the various end grouping of the chain of the copolyethers are listed below in Table I.

As it will be seen in Table I, in the nuclear magnetic resonance spectrum of fluorine, the presence in the chain of the group —O—$CF_2$—$CF(CF_3)$—O— is indicated by the resonance of 5 fluorine atoms in the zone of $+80$ p.p.m. (from $CFCF_3$), and of 1 fluorine atom in the zone of $+144$ p.p.m. Resonance bands in the zones of $+49$ p.p.m. and $+51$ p.p.m. are due to the fluorine atoms of the group —O—$CF_2$—O, whereas bands in the zone of $+55$ p.p.m. show the presence in the chain of repeating units —$(O-CF_2)_n$— with $n \geq 2$. Resonance in the zone of 90 p.p.m. indicates the presence of the tertiary fluorine atom in the —O—$CF(CF_3)$—O— group.

TABLE I

| Groups | P.p.m.[1] (from $CFCl_3$) | Number of fluorine atoms |
|---|---|---|
| —O—$CF_2$—$CF_2$—O—$CF_2$—O—$CF_2$—$CF_2$—O— | +51.9 | 2 |
| —O—$CF_2$—$CF_2$—O—$CF_2$—O—$CF_2$—O— | +53.6 | 2 |
| —O—$CF_2$—O—$CF_2$—O—$CF_2$—O— | +55.3 | 2 |
| —O—$CF_2$—$CF_2$—O—$CF_2$—$CF_2$—O—$CF_2$—$CF_2$—O— | +89.3 | 4 |
| —O—$CF_2$—O—$CF_2$—$CF_2$—O—$CF_2$—O— | +91 | 4 |
| —O—$CF_2$—$CF(CF_3)$—O— | +80 / +144 | 5 / 1 |
| —$OCF_2$—O— | +49 to +51 | 2 |
| —$(CF_2$—O$)_n$— | +55 | [2] $2_n$ |
| —O—$CF(CF_3)$—O— | +90 | 1 |
| $CF_3$—O—$CF_2$—$CF(CF_3)$—O— | +55.8 / +85.3 | 3 / 2 |
| $CF_3$—O—$CF(CF_3)$—$CF_2$—O— | +54 | 3 |
| $CF_3$—O—$CF_2$—O— | +57.8 | 3 |
| $CF_3$—O—$CF(CF_3)$—O— | +55.2 / +99 / +86.5 | 3 / 1 / 3 |
| $CF_3$—O—$CF_2$—$CF_2$—O— | +56 | 3 |
| —O—$CF_2$—$CF(CF_3)$—O—COF | +11.5 / +77.8 / +143 | 1 / 3 / 1 |
| —O—$CF(CF_3)$—$CF_2$—O—COF | +12.2 | 1 |
| —O—$CF_2$—O—COF | +14.8 +15.0 / +58 +59 | 1 / 2 |
| —O—$CF_2$—COF | —13.3 | 1 |
| —O—$CF(CF_3)$—COF | —26 | 1 |
| —O—$CF_2$—$CF_2$—O—$CF_2$—COF | —13.3 | 1 |
| —O—$CF_2$—$CF_2$—O—COF | +14.8 | 1 |

[1] p.p.m.=Magnetic field expressed in parts per million from $CFCl_3$ used as internal reference.
[2] $n \leq 2$.

The presence of peroxidic oxygen in the product is indicated and its content determined by reacting a sample of the obtained product with NaI in acetic anhydride solution and then titrating the freed iodine with thiosulfate. Thus, 200 mg. of product are dissolved in 5 cc. of $$CF_2Cl-CFCl_2$$

To this solution are added 20 cc. of acetic anhydride and 2 g. of NaI. The mixture is stirred for 1 hour at room temperature, 200 cc. water containing 2 g. of KI are added thereto, followed by additional stirring for a few minutes and then titrating with 0.1 N sodium thiosulfate.

The number of grams of active oxygen per 100 grams of product are cauculated using the formula $$\frac{8 \cdot n}{100 \cdot p} = \text{grams of active oxygen/100 g. product}$$

wherein $n$ indicates the cc. of 0.1 N solution of thiosulfate used and $p$ is the amount in grams of the tested product.

The presence of peroxidic oxygen groups is also clearly indicated by the presence of resonance bands in the zones of 75, 85, 89, 134, 137 and 142 p.p.m. from CFCl$_3$ in the N.M.R. spectrum of fluorine.

The presence of units of C$_3$F$_6$ bonded directly to each other is considered to be indicated by the N.M.R. spectrum of fluorine, since it then shows resonance bands in the zones between +68 and +73 p.p.m. from CFCl$_3$. Further, other large resonance bands that are attributed to these same units appear in the zones between +76 and +80 p.p.m. and between +130 and +143 p.p.m. from CFCl$_3$.

It is therefore clear that, from an examination of the magnetic resonance spectrum of fluorine and from the data obtained by other types of chemical analysis, the actual average chemical composition of the polyetheric copolymeric products of the present invention can be ascertained in a satisfactory manner.

The crude linear copolyether reaction product can be used as is for various applications, and fractions characterized by a relatively restricted molecular weight distribution, such as those obtainable by simple distillation, may be entirely suitable, without the necessity of isolation as pure chemical compounds. However, if desired, pure compounds that are homologous members of the series of products within the scope of the general formula defining the products of this invention can be separated from the crude mixture by conventional means such as fractional distillation, gas-chromatography, selective extraction with solvent, etc.

The products of this invention which contain a high content of peroxidic groups find utility as cross-linking agents for elastomeric polymers such as fluorinated polymers and copolymers, e.g., copolymers of vinylidene fluoride and hexafluoropropylene.

The non-peroxidic copolymers are liquids which, depending on the molecular weights, may have a boiling temperature which may vary from as low as about 10–20° C., under normal pressure (low molecular weight materials) to more than about 200° C. under reduced pressure of 1 mm. Hg (high molecular weight materials). They have very high chemical and thermal stability and exhibit very good lubricating properties. For these reasons they may be used as hydraulic fluids, heat exchange liquids, and/or as lubricants under particularly severe temperature conditions. These non-peroxidic copolyethers possess several advantages as compared to the homopolymeric polyethers of the (—C$_3$F$_6$—O—)$_n$ type and of the

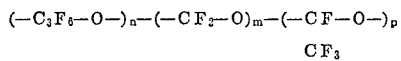

type. Thus, they exhibit, with respect to the homopolymers, improved stability to heat and oxidation, improved low temperature characteristics, such as lower pour point due to a lower glass transition, and a very high index of viscosity, lower volatility at a given viscosity, and lower cost, since C$_2$F$_4$ is less expensive than C$_3$F$_6$. Finally the copolyethers of this invention have a higher combined oxygen content, as compared to that of polyethers derived solely from the perfluoropropylene.

EXAMPLE 1

The apparatus consisted of a cylindrical 0.4 liter glass reactor containing an ultraviolet-ray lamp (Hanau Q 81),[1] and provided with a thermometer, a gas inlet pipe dipping down to the bottom of the vessel, a gas outlet pipe provided with a reflux condenser cooled to −780° C., and an outer cooling bath, 380 g. of perfluoropropene were introduced into the reactor by distillation at low temperature (−70° C.). At a temperature of −70° C. and under

[1] According to the producer (Quarzlampen Gesellschaft m.b.H. Hanau), this lamp absorbs 75 watt and emits an overall radiation, comprised between 2000 and 4000 Å., of 12.5 watts. Of said overall radiation, 3.4 watts have a wave length below 3000 Å. The lamp is enclosed in a quartz well having a tubular shape whose external diameter is 20 mm. and length is 245 mm.

ultraviolet radiation, the introduction through the inlet dipping pipe of 60 l./h. (liters per hour) of an anhydrous gas consisting of 2 parts by volume of oxygen and 1 part by volume of tetrafluoroethylene was started. This gas was fed to 150 liter gasometer by means of a circulating pump. The gas leaving the reactor through the reflux condenser was continuously recycled to the same gasometer, after washing with a 20% KOH solution.

After 6 hours of reaction, during which the temperature of the liquid phase had gradually risen to −27° C. and a total of 52 liters of gas had been absorbed, the reaction was stopped.

By distillation at room temperature, 212 g. of unreacted C$_3$F$_6$ were removed from the liquid phase and 215 g. of liquid reaction products were recovered.

The following fractions were separated by distillation:

| Fraction: | Weight (g.) | Distillation range |
|---|---|---|
| a | 15 | 25–60° C./760 mm. Hg. |
| b | 9 | 47–105° C./20 mm. Hg. |
| c | 15 | 80–120° C./0.5 mm. Hg. |
| d | 22 | 102–154° C./0.5 mm. Hg. |
| e | 125 | 160–260° C./0.5 mm. Hg. |
| f | 27 | 260–305° C./0.5 mm. Hg. |
| g | 2 | Residue. |

Fraction (f) had a density $d_4^{24}$ of 1.8948 and a viscosity at 24° C. of 2990 centipoises, a value considerably higher than that of 1.87–1.88 of the fraction with analogous distillation range obtained by photochemical reaction of oxygen with C$_3$F$_6$ only.

EXAMPLES 2–8

A 600 cc. cylindrical glass reactor provided with a coaxial U.V. lamp of the Hanau Q 81 type, with a dipping tube for the introduction of gasses and a gas outlet pipe provided with a reflux condenser kept at −80° C., was used. By means of an outer cooling bath, 700 g. of perfluoropropylene were condensed in the reactor and then the introduction through the dipping tube of a gaseous mixture consisting of oxygen and tetrafluoroethylene, in the ratios set forth in Table II below, was started. After adjusting the reactor to the temperature indicated in Table II, the U.V. lamp was activated. During the entire run, the flow-rate of gas feed and the temperature were kept constant, and the gases leaving the reactor were washed in a 20% by weight of a KOH solution and then eliminated after analysis by gas-chromatography. At the end of the irradiation, unreacted perfluoropropylene and tetrafluoroethylene were removed by evaporated at room temperature under reduced pressure and condensed in a cylinder maintained at −180° C., and a polymeric oily residue was obtained, which residue was subjected to elemental analysis, oxidimetric determination by iodometric analysis, and to NMR analysis.

By operating as described above, a series of seven experimental runs was carried out in which the following parameters were varied: reaction temperature, flow rates of the two gases fed (O$_2$ and C$_2$F$_4$) and irradiation time.

The products obtained in this series of seven runs were subjected to NMR examination, and were found to consist of polymeric chains containing, as fundamental units, the perfluoroalkylene groups —CF$_2$—CF$_2$ and

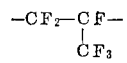

linked to each other through oxygen linkages of the ether type —O— or of the peroxidic type —O—O—.

Groups of the —CF$_2$— type were also present but in very low amounts as compared with the other units (not more than one —CF$_2$— group per 30 total C$_2$F$_4$ and C$_3$F$_6$ units).

The chain terminal groups were found to consist of CF$_3$— and —COF groups in practically equal amounts. The average molecular weight corresponded to not less than 40 monomeric units. Secondary reaction products consisted of the two epoxides ($C_2F_4O$ and $C_3F_6O$) of the olefins used as starting materials. Said two epoxides were generally found to be formed each in a proportion from about 2% by weight at −70° C. to about 8% at −40° C. with respect to the weight of the overall amount of the polymeric product. The $C_3F_6O$ was recovered from the reaction mixture together with the unreacted perfluoropropylene while the $C_2F_4O$ was removed from the reaction zone together with the gaseous overhead stream and was therefore analyzed in the waste gases.

Finally, some of the olefin reactants were transformed into $COF_2$ and $CF_3$—COF which were absorbed by reacting with the 20% KOH solution used for washing the gases. This solution was eliminated without carrying out any determination of the amounts of $COF_2$ and $CF_3COF$ formed in the photochemical reaction.

In the following Table II, the reaction conditions and the characteristics of the oily products formed (amount in grams, oxidizing power expressed at g. of active oxygen per 100 g. of polymeric substance, and ratio between the two units types, $C_2F_4$ and $C_3F_6$ existing in the chain) are reported. The amounts of the two olefins which were unreacted at the end of each run are also reported.

sponding to the formula $CF_2O_{0.59}$ and containing 0.12 g. of peroxidic oxygen per 100 g. of product were obtained.

Spectroscopic examination showed that the product consists of linear chains containing —$CF_2O$—, $$—CF_2—CF_2—O—$$

and —$C_3F_6O$— units in a ratio of 2:1:3 with neutral terminal groups —$CF_3$ and $CF_3$—O—$CF(CF_3)$— and terminal groups of acid nature having the structures —$CF_2$—O—COF, —$CF(CF_3)$—$CF_2OCOF$, $$—CF_2—CF(CF_3)$$

—OCOF, —$CF_2$—COF.

This polyether was distilled and 15 g. of a fraction having a boiling temperature between 150 and 220° C. at 1 mm. Hg was separated.

EXAMPLE 11

The run described in Example 10 was repeated, the only difference being that the temperature of the reaction mixture was kept at +20° C.

After 4 hours of irradation, followed by removal of the solvent, 4 g. of an oily substance were obtained, hav-

TABLE II

| | Working conditions | | | | Oily product | | | | | |
|---|---|---|---|---|---|---|---|---|---|---|
| | | Average irradiation index | L./h. of— | | | | Average molecular | Oxidizing | $C_2F_4/C_3F_6$ | Recovered olefins, g. |
| Ex. No. | Temp. | (watt/cm.²) | $O_2$ | $C_2F_4$ | Time, hours | Amount, g. | weight | power | ratio | $C_2F_4$ | $C_3F_6$ |
| 2 | −50 | 6 | 40 | 20 | 2 | 198 | 10,000 | 2.20 | 1.2 | 30 | 545 |
| 3 | −50 | 6 | 80 | 20 | 2 | 220 | 12,000 | 3.30 | 1.7 | 28 | 490 |
| 4 ² | −40 | 6 | 20 | 20 | 2 | 78 | (¹) | (¹) | (¹) | (¹) | (¹) |
| 5 | −40 | 6 | 40 | 20 | 2 | 158 | 8,000 | 0.95 | 1.9 | 33 | 510 |
| 6 | −40 | 6 | 40 | 2 | 2 | 188 | 6,000 | 0.71 | 0.1 | Traces | 480 |
| 7 | −45 | 6 | 40 | 2 | 4 | 315 | 6,000 | 0.65 | 0.1 | Traces | 330 |
| 8 | −65 to −70 | 6 | 40 | 1 | 2 | ³ 178 | 13,000±2,000 | 0.76 | 0.05 | Traces | 503 |

¹ Not determined.
² The run of Example 4 had an anomalous behavior as compared to the other runs in the table; the product of this run was found to be a semisolid jelly mass mostly consisting (about 50%) of polytetrafluoroethylene, derived from the homopolymerization of $C_2F_4$. This run shows that, if oxygen and tetrafluoroethylene are fed in a mutual ratio lower than a certain value, the homopolymerization of tetrafluoroethylene takes place, as well as the oxidation of the olefins. The value of the ratio between $O_2$ and $C_2F_4$ flow-rates at which the homopolymerization of $C_2F_4$ becomes noticeable, depends on all the other experimental conditions, especially on the temperature at which the synthesis is carried out. For temperatures in the range from −60° to 20°C, this value of the $C_2F_4/O_2$ ratio (by volume) is 1 or higher than 1.
³ The ratio of $CF_2/C_2F_4+C_3F_6$ units is 1/40; by fractionating further, higher boiling fractions were obtained having an average molecular weight of 17,000±3,000.

EXAMPLE 9

Using the same apparatus and the same procedure described in Examples 2–8, the run of Example 5 was repeated, the only difference being that a low-pressure mercury vapor lamp of the Hanau NK 6/20 type was used. This tubular 20×250 mm. lamp emits 0.9 watt of a radiation having a wave length from 2000 to 3000 A. The average irradiation index expressed in watt/cm.² was 1.4.

26 g. of an oily product having an average molecular weight of 15,000 and an oxidizing power corresponding to 5.0 g. of active oxygen per 100 g. of product were obtained.

The ratio between the $C_2F_4$ and $C_3F_6$ units was 1.22:1. The $CF_2/C_2F_4+C_3F_6$ ratio was 1:20.

EXAMPLE 10

500 cc. of $CF_2Cl$—$CFCl_2$ cooled to −5° C. were introduced into a cylindrical 800 cc. glass reactor provided wth a Hanau TQ 81 type U.V. lamp, a thermometer, a dipping tube for the introduction of the gaseous reactants, external cooling bath and a reflux condenser maintained at −78° C. The irradiation of the liquid phase was started while 70 l./h. of a gaseous mixture containing $C_2F_4$, $C_3F_6$ and $O_2$ in the mol ratios of 1:1:1.5 was bubbled through the liquid phase.

After 4 hours, the feeding of gas was stopped, and the irradiation of the liquid phase was continued for an additional 15 hours.

Thereafter, the solvent was evaporated in 41 g. of a liquid product having an elemental composition correing an average molecular weight of 2,000, in which the ratio between the —$CF_2$—, —$CF_2$—$CF_2$— and $$—CF_2—CF(CF_3)—$$

units was 5:1:1.

The oxidizing power corresponded to 0.1 g. of active oxygen per 100 g. of product.

EXAMPLE 12

Into the same reactor as used in Examples 2–8, 700 grams of $CF_2Cl_2$ were introduced and then the bubbling through the dipping tube of a gaseous mixture consisting of 30 liter/hour of oxygen, 15 liter/hour of $C_2F_4$ and 2 liter/hour of $C_3F_6$ was started. After the temperature of the liquid phase was adjusted to −40° C., a U.V. light quartz lamp of the Hanau type Q 81 ($I=6$ watt/cm.²) was activated. Irradiation and feeding of the gaseous mixture was carried on for 2 hours. After removal of the solvent at room temperature under a reduced pressure of 200 mm. Hg, 110 grams of a polymeric product were obtained, having an average molecular weight of about 8,000 and consisting of perfluoroalkylene units of the three types —$CF_2$—, —$CF_2$—$CF_2$— and —$CF_2$—$CF(CF_3)$— linked to each other in part by peroxidic (—O—O—) bridges and in part by either (—O—) bridges. The ratio between perfluoroalkylene units of the three types was 10:28:3. The oxidizing power of this product corresponded to 2.30 g. of active oxygen per 100 grams of material.

EXAMPLE 13

In the reactor used in Examples 2–8, 700 g. of hexafluoropropylene were condensed at a temperature of −40°

C. The U.V. lamp was then activated and a gaseous flow consisting of 40 l./h. of oxygen and 2 l./h. of tetrafluoroethylene was fed through the dipping tube, keeping the reactor at a constant temperature of −35° C. by means of an external cooling bath. After 4 hours of irradiation, the excess perfluoropropylene was evaporated under a reduced pressure of 200 mm. Hg and 290 g. of polyether oil, which, upon iodometric analysis was found to contain 0.56 g. of active oxygen per 100 g. of product, were obtained.

From N.M.R. examination, the polyether was found to consist of $-C_2F_4-$ and $-C_3F_6-$ units in the ratio of 0.26. $-CF_2-$ units were also found to be present in such lower proportions that the $CF_2/(C_3F_6+C_2F_4)$ molar was of the order of 0.02.

The chain terminal groups were the $CF_3-$ and COF type, in practically equal amounts.

This product was then irradiated with the same U.V. lamp, at room temperature, under a slow nitrogen flow (5 liter/hour) for 30 hours. At the end of the reaction, 275 g. of polyether having an active oxygen content of 0.05 g. per 100 g. of product were obtained.

This polyether was further heated in a glass flask at 250° C. for 3 hours, during which it lost 4% of its weight in the form of gaseous products ($COF_2$) and the peroxidic oxygen content was further reduced to 0.01 g./100 g. of product.

The ratio between the $-C_2F_4O-$ and $-C_3F_6O-$ units of the polyether thus treated was 0.25. The terminal groups consisted of $CF_3-$ groups of the two types $CF_3-O-CF_2-CF(CF_3)-$ and $CF_3-O-CF_2-CF_2-$ in the ratio of about 4, acylfluoride groups $-CF_2-COF$ and $-CF(CF_3)-COF$, and ketone groups $$-CF_2-CO-CF_3$$

in the ratio of 2:1:5. The ratio between $CF_3-$ terminal groups and $(COF+CF_2-CO-CF_3)$ groups was about 1.

Variations can, of course, be made without departing from the spirit of our invention.

Having thus described the invention, what it is desired to secure and claim by Letters Patent is:

1. A process for the preparation of a linear perfluorinated copolyether having a chain structure consisting essentially of $-C_3F_6-O-$ and $-CF_2-CF_2-O$ repeating units and which may additionally contain either or both of $-CF_2-O-$ and $$-\underset{\underset{CF_3}{|}}{CF}-O-$$

repeating units, wherein $C_3F_6$ is a perfluoroalkylene group derived from the opening of the double bond of a hexafluoropropylene molecule, the different repeating units having a random distribution along the polyether chain and being linked to one another either directly or through an oxygen atom in which latter case a peroxy group is present along the chain; said copolyether having terminal groups bonded to the ends of said chain structure through an ether oxygen, said terminal groups being selected from the group consisting of $-CF_3$, $CF_3-O-\underset{\underset{CF_3}{|}}{CF}-$, $-COF$, $-CF_2-COF$ and $-\underset{\underset{CF_3}{|}}{CF}-COF$ the total number of repeating units being from about 2 to 100, the number of $-C_3F_6-O-$ units being from about 1 to 100, the number of $-CF_2-CF_2-O$ units being from about 1 to 100, the number of $-CF_2-O-$ units being zero or from 1 to 80, the number of $$-\underset{\underset{CF_3}{|}}{CF}-O-$$

units being zero of from 1 to 9, the number of peroxy groups not exceeding 50, the ratio of $-CF_2-CF_2-O-$ units to $-C_3F_6-O$ units being from about 0.01 to 10, the ratio of $-CF_2-O-$ units to the sum of $$-C_3F_6-O-$$

units plus $CF_2-CF_2-O-$ units being from about zero to 5, the ratio of $$-\underset{\underset{CF_3}{|}}{CF}-O-$$

units to the sum of $-C_3F_6-O-$ units plus $-CF_2-O-$ units plus $-CF_2-CF_2-O-$ units being from about 0 to 0.1, and the ratio of peroxy groups to the sum of $-C_3F_6-O-$ units plus $-CF_2-O-$ units plus $$-CF_2-CF_2-O-$$

units plus $$-\underset{\underset{CF_3}{|}}{CF}-O-$$

units being from zero to 0.5, which process comprises subjecting a mixture of perfluoropropylene and tetrafluoroethylene, in the liquid phase, said liquid phase comprising perfluoropropylene or an inert solvent containing at least 0.01 mol/liter of $C_3F_6$, said liquid phase containing from 0.01 to 1 mole of tetrafluoroethylene per liter of liquid phase, to a photochemical reaction with molecular oxygen at a temperature between about −100° C. and +25° C., at a pressure from about atmospheric pressure to about 5 atmospheres, in the presence of ultra-violet radiation at least about 1% of which radiation has a wave length below 3300 A., the oxygen being fed to the liquid reaction phase in such amount as to maintain the liquid phase continuously saturated with oxygen, at a partial pressure of oxygen between about 0.1 and 1 atmosphere.

2. The process of claim 1 wherein the liquid phase is a mixture of the two fluoroolefins with an inert solvent, said mixture containing at least 0.01 mole per liter of perfluoropropylene.

3. The process of claim 1 wherein the temperature is between −70° and +20° C.

4. The process of claim 2 wherein said inert solvent is a halogenated solvent selected from the group consisting of perfluorinated hydrocarbons, perfluorochlorinated hydrocarbons and chlorofluorinated hydrocarbons.

5. The process of claim 4 wherein the solvent is selected from the group consisting of $CF_2Cl_2$, $CF_2Cl-CF_2Cl$, $CF_2Cl-CFCl_2$ and $CHF_2Cl$.

References Cited

UNITED STATES PATENTS 3,442,942  5/1969  Sianesi et al. _____ 260—544 F
3,392,097  7/1968  Gozzo et al. _____ 204—159.22

FOREIGN PATENTS 1,434,537  2/1966  France _____ 260—535 P

MURRAY TILLMAN, Primary Examiner

R. B. TURER, Assistant Examiner

U.S. Cl. X.R.

260—2 XA, 2 BD, 87.5 A, 453 AL, 463, 544 F, 610 D, 615 BF

UNITED STATES PATENT OFFICE
CERTIFICATE OF CORRECTION

Patent No. 3,650,928  Dated March 21, 1972

Inventor(s) DARIO SIANESI, ALDOLFO PASETTI and CONSTANTE CORTI

It is certified that error appears in the above-identified patent and that said Letters Patent are hereby corrected as shown below:

Column 2, line 61, "available" should read -- available, --. Column 3, line 46, "100." should read -- 100, --; line 55, "trus" should read -- true --; line 65, "3% weight" should read -- 3% by weight --.

Column 5, line 28, "-40°C." should read -- -40°C., --; line 55, "tht" should read -- the --. Column 8, line 49, "$CF_2Cl_3$," should read -- $CF_2Cl_2$, --; line 54, "an as-" should read -- an es- --. Column 9, line 2, "tetrafluoroethylene" should read -- tetrafluoroethylene and perfluoropropylene --; line 9, "tr" should read -- ter --, line 58, "consummed" should read -- consumed --. Column 10, in Table I, under the heading "Groups", lines 1-14, Each of the first fourteen formulas are incomplete in their present form, and a hyphen (-) should be inserted at the end of each said formula to complete them; Column 10, at the end of Table I, the second footnote, "n$\leq$2." should read -- n$\geq$2. --. Column 11, line 34, "copolymers" should read -- copolyethers --; lines 48-50, that portion of the formula reading "-(-CF- "
$\phantom{should read ---(-CF---; line 66,}$ $CF_3$ should read -- -(-CF- --; line 66, "780°C.," should read
$\phantom{should read ---(-}CF_3$ -- 78°C., --. Column 12, line 5, "fed to" should read -- fed from a --; line 49, "evaporated" should read -- evaporation --. Column 13, line 18, "at g." should read -- as g. --;

PR

UNITED STATES PATENT OFFICE
CERTIFICATE OF CORRECTION

Patent No. 3,650,928     Dated March 21, 1972

Inventor(s) DARIO SIANESI, ADOLFO PASETTI and CONSTANTE CORTI

It is certified that error appears in the above-identified patent and that said Letters Patent are hereby corrected as shown below:

PAGE 2 line 64, "wth" should read -- with --.
Column 14, line 16: "Hg was" should read -- Hg were --;
line 68, "either" should read -- ether --. Column 15, line 7, "of polyether" should read -- of a polyether --; line 16, "were the" should read -- were of the --; line 44, "-CF$_2$-CF$_2$-O" should read -- -CF$_2$-CF$_2$-O- --; line 60, "-CF-COF" should read $$-CF-COF; --; \text{ line 65, "-CF}_2\text{-CF}_2\text{-O" should read } -- -CF_2-CF_2-O- --$$
$$\underset{CF_3}{|}$$

Column 16, line 9, "CF$_2$-CF$_2$-O-" should read -- -CF$_2$-CF$_2$-O- --;

Signed and sealed this 22nd day of August 1972.

(SEAL)
Attest:

EDWARD M. FLETCHER, JR.          ROBERT GOTTSCHALK
Attesting Officer                 Commissioner of Patents